United States Patent [19]

Matsuo

[11] Patent Number: 5,179,505
[45] Date of Patent: Jan. 12, 1993

[54] EJECTOR FOR MEMORY CARD

[75] Inventor: Toshihiko Matsuo, Tokyo, Japan

[73] Assignee: Fuji Photo Film Co., Ltd., Kanagawa, Japan

[21] Appl. No.: 766,292

[22] Filed: Sep. 27, 1991

[30] Foreign Application Priority Data

| Sep. 28, 1990 | [JP] | Japan | 2-261300 |
| Sep. 28, 1990 | [JP] | Japan | 2-261301 |
| Sep. 28, 1990 | [JP] | Japan | 2-261302 |
| Sep. 28, 1990 | [JP] | Japan | 2-261303 |
| Sep. 28, 1990 | [JP] | Japan | 2-261304 |

[51] Int. Cl.$^5$ .......................................... H05A 1/14
[52] U.S. Cl. ..................... 361/395; 235/495;
361/392; 361/394; 358/412; 358/906; 358/909; 354/209; 439/140
[58] Field of Search ............... 235/379, 492, 495;
360/133, 135; 361/392, 394, 395, 399, 415;
358/229, 209, 906, 909, 41, 335; 354/105, 106,
289.1, 296, 412; 365/52, 37; 369/77.1, 79;
439/131, 136-140, 297, 298, 310; 355/14 C, 75, 115

[56] References Cited

U.S. PATENT DOCUMENTS

| 4,524,268 | 6/1985 | Fukatsu | 235/379 |
| 4,849,793 | 7/1989 | Someya | 355/75 |
| 4,958,181 | 9/1990 | Ishikawa et al. | 354/412 |
| 4,972,216 | 11/1990 | Ueda et al. | 354/412 |
| 4,974,011 | 11/1990 | Azuma et al. | 354/412 |
| 5,018,017 | 5/1991 | Sasaki et al. | 358/909 |
| 5,028,942 | 7/1991 | Kirigaya | 354/106 |
| 5,032,921 | 7/1991 | Harase et al. | 358/909 |
| 5,034,804 | 7/1991 | Sasaki et al. | 358/909 |
| 5,035,633 | 7/1991 | Kobayashi et al. | 439/140 |
| 5,036,344 | 7/1991 | Inoue et al. | 354/106 |
| 5,036,430 | 7/1991 | Hills | 361/399 |
| 5,040,016 | 8/1991 | Ishikawa et al. | 354/412 |
| 5,070,234 | 12/1991 | Ishii et al. | 235/492 |
| 5,081,482 | 1/1992 | Miki et al. | 354/288 |
| 5,103,250 | 4/1992 | Arifuku et al. | 354/106 |
| 5,128,700 | 7/1992 | Inoue et al. | 354/106 |
| 5,130,733 | 7/1992 | Taniguchi et al. | 354/400 |
| 5,130,804 | 7/1992 | Tamura et al. | 358/209 |
| 5,130,813 | 7/1992 | Oiz et al. | 358/906 |
| 5,132,949 | 7/1992 | Choi | 369/37 |
| 5,134,434 | 7/1992 | Inoue et al. | 355/68 |

FOREIGN PATENT DOCUMENTS

2198595 6/1988 United Kingdom ............... 361/399

Primary Examiner—Leo P. Picard
Assistant Examiner—D. Sparks
Attorney, Agent, or Firm—Sughrue Mion Zinn Macpeak & Seas

[57] ABSTRACT

A memory card ejector has an eject knob to be externally operated and a lock release button. As a memory card is loaded in a card receiving chamber, a lock lever moves to a locking position so that a claw of the lock lever engages with a recess of the memory card to lock the card at a load completion position. In association with the lock lever, a card detecting switch turns off the supply of power to circuit components of an electronic apparatus. When the lock release button is depressed, the lock lever rotates in the counter-clockwise direction to move to a lock release position whereat the card detecting switch is turned off to stop powering the electronic apparatus. As the eject knob is slid, an associated lever together with an eject lever moves so that the end of the eject lever pushes a slide plate toward a card inlet port with a relatively strong force. A hook of the slide plate pushes the front end of the memory card to discmount it from a connector. As the associated lever further rotates, the eject lever rotates using a stopper as a fulcrum to thereby move the slide plate by a relatively large amount and extend the rear end of the memory card out of the card inlet port.

17 Claims, 7 Drawing Sheets

EJECTOR FOR MEMORY CARD

BACKGROUND OF THE INVENTION

1. Field of the Invention

The present invention relates to an ejector for memory cards used with electronic still cameras, information processing apparatus or the like.

2. Description of Related Art

Recently, a memory card (also called an IC card) of about 2 mm thickness has been used widely as an external memory for an electronic still camera, information processing apparatus, or the like. The memory card is provided with a number of terminal holes at a front side for transferring a great amount of information to and from an apparatus main body. The apparatus main body is formed with a card receiving chamber which is provided at the innermost position thereof with a connector having a number of terminal pins. When the memory card is loaded in the apparatus main body, it is contained completely within the chamber. To move the memory card to the position at which an operator can manually draw it out, there is provided an ejector.

In an electronic still camera, whether a memory card is being loaded or not is checked from an echo signal in response to a check signal sent to the connector upon turning on the power source. If a memory card is still not loaded, an indication such as "00" is flashed on a liquid crystal panel to urge a user to load a memory card. When the memory card is loaded, an empty recording area is checked to display the number of frames capable of taking pictures or scenes, on the liquid crystal panel.

One known type of a conventional ejector is constructed such that, when an eject knob is slid, an eject member moves toward both lateral sides of a connector and pushes lateral ends of the front side of a memory card and moves it back to a card inlet port. As the front side lateral ends of the memory card are pushed, first the memory card is dismounted from the connector, and then the rear side of the card comes out of the card inlet port.

A connector and a card are coupled together by a plurality of terminal pins and holes, so that a relatively large force is required to dismount the memory card from the connector. In each of the terminal holes, a pair of contact segments are disposed to receive and tightly clamp one of the terminal pins inserted therebetween. In the above-described conventional ejector, the eject knob is formed integrally with the eject member. Force applied to the eject knob is directly transmitted to the eject member. Therefore, a relatively large force is required to dismount a memory card, posing a problem of a poor performance in manual handling.

When a power switch of a conventional electronic still camera is turned on, circuit components of the camera main body are powered to enter a standby state of photographing, even if a memory card is still not loaded and cannot actually take a scene, posing a problem of consuming unnecessary power. Furthermore, a conventional ejector is used with a card receiving chamber whose one wall is constituted by a printed circuit board mounted with a connector, along which circuit board a memory card is connected to the connector. Since the connector occupies a partial area of the printed circuit board, the number of components to be mounted on the board is reduced, thereby reducing the effective application of the circuit board.

SUMMARY OF THE INVENTION

It is therefore a principle object of the present invention to provide a memory card ejector capable of providing a good performance for manual operation in ejecting a memory card.

It is another object of the present invention to provide a memory card ejector capable of reliably detecting a completion of the loading of a memory card, and preventing unnecessary power from being consumed.

It is a further object of the present invention to provide a memory card ejector allowing a printed circuit board to have a highly effective application.

Generally, a rather large force is required to pull out a memory card from a card receiving chamber for about the first 3 mm. Thereafter, a relatively small force is enough to pull out the card. In view of this, according to the present invention, two levers are used. A first stage lever having a large leverage is used to dismount a memory card from the connector with a relatively large force. After dismounting the card from the connector, a second stage lever having a small leverage is used to push the card so that a small stroke of an operation member allows a large retract motion of the card.

According to a preferred embodiment of the present invention, an ejector is provided with a slide member which moves between a retracted position and an eject position. At the retracted position, the memory card is connectable to the connector disposed at the innermost position of a card receiving chamber. At the eject position, the rear end of the memory card extends out of the card receiving chamber while the front end of the card is pushed. As an operation member is slid for ejecting the memory card, an associated member rotates about its one end so that an eject member disposed in the rotation range of the associated member pushes the slide member toward the eject portion. A hook of the slide member pushes the front end of the memory card to dismount it from a connector. Immediately thereafter, one end of an eject lever is received by a stopper member so that the eject lever rotates to push the slide member using the other end. The slide member moves a long distance relative to a small stroke of the operation member.

According to another preferred embodiment of the present invention, a card holder is fixedly mounted on a chassis, the card holder and the chassis defining the card receiving chamber. A guide opening is formed in the card holder. The hook of the slide member extends via this guide opening into the card receiving chamber. The hook guides the motion of the slide member. There are also provided a card detecting member for detecting that the memory card is connected to the connector, a card lock member for locking the memory card by moving to a lock position as the card detecting member moves, and a switch means for detecting that the card lock member is at the lock position, to control the power circuit components of the apparatus. A spring member is extended between the card detecting member and the slide member so that the card detecting member is biased in the direction of ejecting the card, and the slide member is biased to the retracted position. On the bottom surface of the chassis, there is mounted a printed circuit board on which circuit components constituting a read/write controller are assembled. The printed circuit board is connected to the connector via a flexible wiring sheet.

According to the present invention, during the initial stage of the sliding of the operation member, the eject member is moved in association with the associated member. The associated member has a large leverage, and one end of the eject member pushes the slide member strongly. As a result, a light or gentle sliding of the operation member causes the dismounting of the memory card from the connector. After dismounting the memory card from the connector, as the eject member rotates, the slide member moves by a large amount upon application of a small stroke of the operation member. It is therefore possible to eject the memory card to such a position whereat the rear end of the card can be manually grasped.

There is further provided a card lock member for locking a memory card inserted to a load completion position. A switch means operates in association with the card lock member. The switch means turns on the power of the apparatus. It is therefore possible to reliably detect the presence/absence of a loaded memory card, and prevent unnecessary consumption of a battery power source. Furthermore, the slide member and associated member are superposed upon the card holder in association with each other. It is therefore simple to assemble and easy to unite them, resulting in an efficient assembly operation and a low manufacturing cost. A spring is extended between the slide member and the card detecting member to bias them in opposite directions, thereby reducing the number of springs. Still further, a printed circuit board is mounted on the bottom surface of the chassis, and it is not used as a wall of the card receiving chamber. As a result, the size of the printed circuit board can be made small, and the effective application of the circuit component can be improved.

BRIEF DESCRIPTION OF THE DRAWINGS

The above objects and advantages of the present invention will become more apparent from the following detailed description of a preferred embodiment when read in connection with the accompanying drawings, in which.

DETAILED DESCRIPTION OF THE PREFERRED EMBODIMENTS

Figure 1:
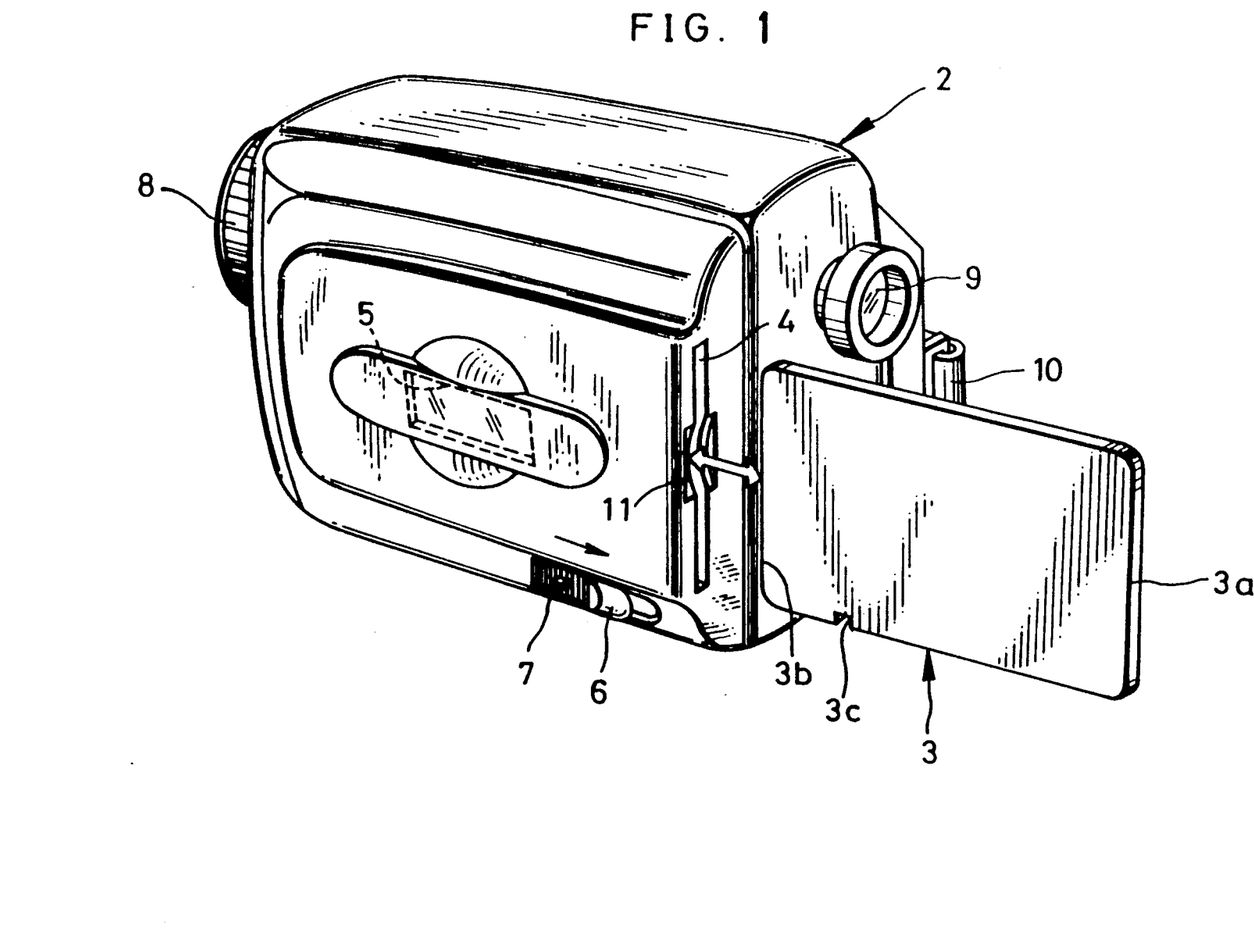
FIG. 1 is a perspective view of an electronic still camera provided with a memory card ejector according to the present invention.

FIG. 1 shows an electronic still camera provided with a memory card ejector according to the present invention. On the back panel of the electronic still camera 2, there is formed an elongated card inlet port 4 via which a memory card 3 is inserted and pulled out, and an operation member in the form of a slidable eject knob 6 at the lower position. A lock release button 7, for releasing a lock state of the memory card 3, is mounted at the middle of the eject knob 6. As the eject knob 6 is slid in the direction indicated by an arrow while pushing down the lock release button 7, the memory card 3 is ejected out to the position whereat the memory card 3 can be grasped by the user's fingers.

A window 5 is formed on the side panel of the electronic still camera 2, the window allowing the operator to observe the loading condition of the memory card 3. A taking lens 8 is mounted on the front side of the electronic still camera 2, and a view finder 9 on the back side. Reference numeral 10 represents a grip belt, and reference numeral 11 represents a curved recess so as to permit an easy grasp of a rear end 3a of the memory card 3 by the user.

The memory card 3 has a RAM therein and is packaged with plastics into a rectangular shape having a thickness of about 2 mm, as is well known. When taking a scene, video signals are written in the RAM, and when reproducing the scene, they are read from the RAM. At the front end 3b of the memory card 3, a number of terminal holes 3d (refer to FIG. 3) are formed. A recess 3c is formed in one of the two long sides of the memory card 3, which recess is designed to engage with a lock mechanism as the card 3 is loaded.

Figure 2:
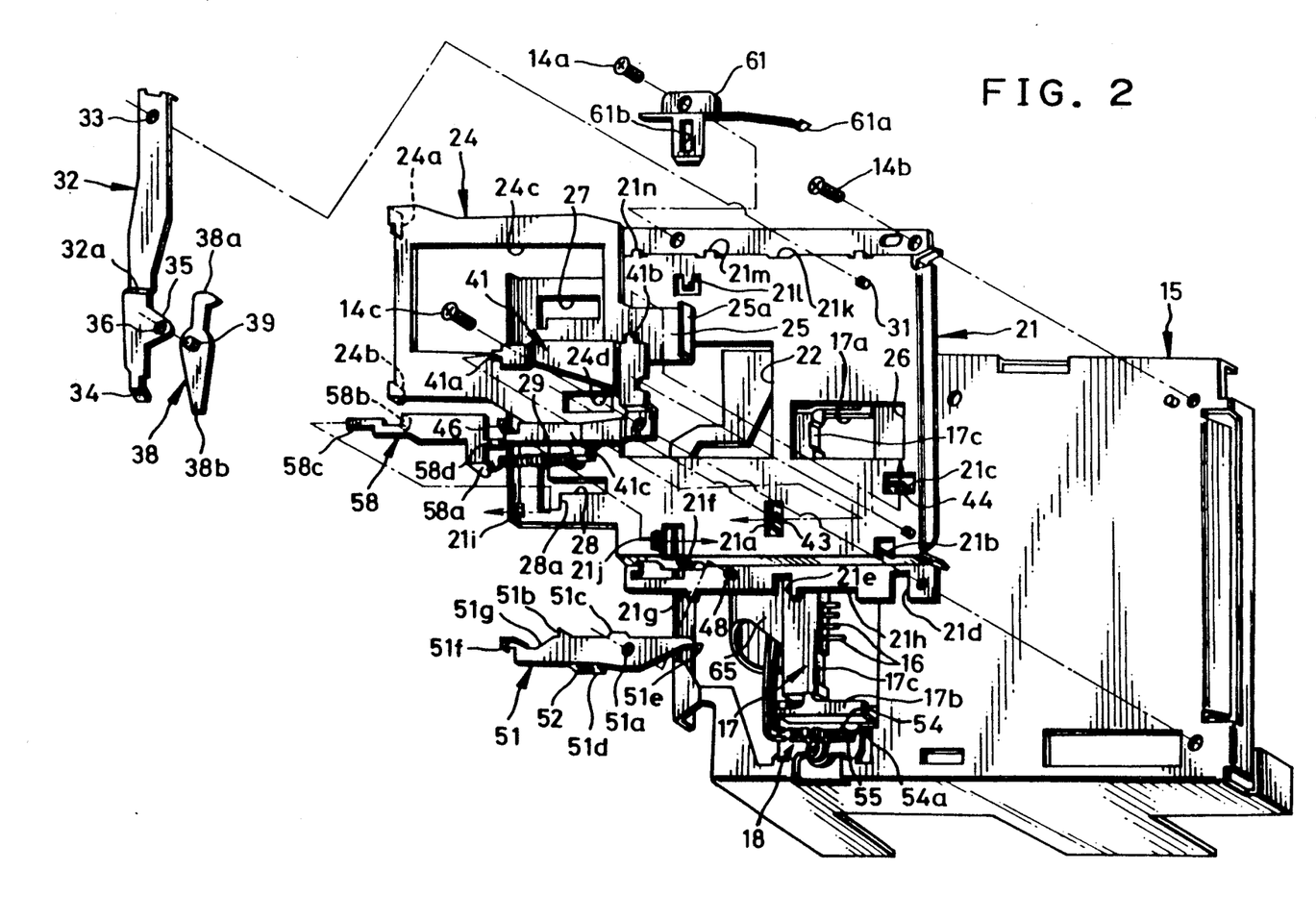
FIG. 2 is an exploded perspective view showing an embodiment of a memory card ejector.

FIG. 2 shows an embodiment of a memory card ejector. On a chassis 15, there are fixedly mounted a card holder 21 in generally a channel shape by means of three screws 14a to 14c, the card holder is in generally a channel shape as observed from a lateral side. A card receiving chamber 13 is formed between the chassis 15 and card holder 21 to load the memory card 3 therein. A slide member in the form of a slide plate 24 is provided above the card holder 21, which plate can freely slide so as to eject the memory card 3 out of the card receiving chamber 13. The slide plate 24 moves between an eject position and a retracted position. At the eject position, the rear end 3a of the memory card 3 extends out of the card inlet port 4. At the retracted position, the slide plate 24 is retracted to the position whereat the plate will not obstruct the connection operation of the memory card 3 to a connector 17.

The connector 17 has a plurality of slender pins 16 corresponding to terminal holes 3d of the memory card 3. The connector 17 is fixedly mounted to the chassis 15 within the card receiving chamber 13 at the innermost position. The connector 17 is integrally formed with guides 17a and 17b into which the corners at the front end 3b of the memory card are fitted for position alignment therebetween.

A card detecting switch 18, normally in an ON state, is mounted below the connector 17, the switch 18 being turned OFF only when the memory card 3 is coupled to the connector 17. The card detecting switch 18 turns ON a main switch (not shown) when it is in an OFF state, to thereby power circuit components of the camera. In this manner, powering the electronic still camera 2 can be automatically executed. In addition, an unnecessary consumption of power can be prevented when the memory card 3 is still not loaded and taking a picture is impossible.

The card holder 21 is formed with an opening 22 facing the window 5, and guide openings 26 to 28 used for slidably holding the slide plate 24. A tongue 25 of the slide plate 24 enters the guide opening 26, and hooks 24a and 24b, for pushing the front end 3a of the memory card 3, enter the guide openings 27 and 28, respectively. At the center of the slide plate 24, there are formed an opening 24c facing the opening 22 for confirming whether the memory card 3 is being loaded or not, and an elongated opening 24d. The latter opening 24d is fitted on a guide protrusion 21a formed on the card holder 21 to move the slide plate 24 along the guide protrusion 21a.

A boss 31 is mounted on the card holder 21, the boss 31 being inserted into a hole 33 of an associated member or lever 32 allowing a rotation of the lever 32. The eject knob 6 is coupled to the distal end 34 of the associated lever 32. As the eject knob 6 is slid in the direction of ejecting the card 3, the associated lever 32 is rotated about the boss 31 in the counter-clockwise direction. Another hole 36 is formed in an extended portion 35 of the associated lever 32 into which a boss 39 of an eject member or lever 38 is inserted, allowing a rotation of the eject lever 38. A protrusion 38a of the eject lever 38 pushes the inner surface of a bent portion 25a of the tongue 25 to move the slide plate 24 together with the memory card 3 from the retracted position to the eject position. As fingers are detached from the eject knob 6, the slide plate 24 recovers back to the retracted position from its eject position, by means of a coil spring 29. In association with the slide plate 24, the associated lever 32 as well as the eject knob 6 moves back to the initial position.

The associated lever 32 is formed with a step 32a at the position one third of the length thereof from one end 34. The side edge of the step 32a pushes the side edge of the eject lever 38 as the associated lever 32 is rotated in the ejection direction (counter-clockwise direction). In place of the step 32a, a protrusion or pin may be mounted on the associated lever 32. The associated lever 32 constitutes a first stage lever having a rather large leverage, and it applies a large force to the slide plate 24 via the eject lever 38.

At the lower position of the card holder 21, a stopper 21b is provided. The stopper 21b abuts the side edge 38b of the eject lever 38 when the associated lever 32 is rotated by a predetermined amount, i.e., when the memory card 3 is dismounted from the connector 17. With the operation of the stopper 21b, as the associated lever 32 is further rotated in the clockwise direction, the eject lever 38 rotates in the clockwise direction. Therefore, the eject lever 38 constitutes a second stage lever, and it moves the slide plate 24 a great distance upon a small amount of sliding of the eject knob 6.

A plate spring 41 is mounted on the card holder 21 and in turn on the chassis 15 by means of the screw 14c. A protrusion 41a of the plate spring 41 is inserted into a hole 43 of a guide protrusion 21a, and another protrusion 41b of the plate spring 41 is inserted into a hole 44 of a bent protrusion 21c. A spring portion 41c of the plate spring 41 extends to the rear side of the card holder 21 through a recess 21d formed in the card holder 21. A tapered protrusion 46 at the distal end of the plate spring 41 extends out of a recess 21e of the card holder 21. The plate spring 41 pushes the associated lever 32 so as to prevent the boss 31 from escaping from the hole 33, and prevents the guide protrusion 21a from escaping from the opening 24d of the slide plate 24. Since the associated lever 32 rides on the slide plate 24, the tongue 25 of the slide plate 24 will not escape from the guide opening 26.

The slide plate 24, associated lever 32, and eject lever 38 are superposed one upon another while maintaining associative operation by the plate spring 41 only, without using a fastening means such as screws. Therefore, an assembly operation can be simplified. Further, it is easy to unify these elements to improve the efficiency of the assembly operation of the electronic still camera 2.

A boss 48 erected on the card holder 21 is inserted into a hole 51a of a lock lever 51, allowing a rotation of the lock lever 51. The lock lever 51 is formed with a lock claw 51b which engages with the recess 3c of the memory card 3 to lock it at a load completed position. The lock claw 51b moves into, and out of, the card receiving chamber 13 via a hole. The lock lever 51 is formed with a protrusion 51c which is loosely fitted in a hole 21f of the card holder 21, and a bent protrusion 51d with a hole 52 into which a protrusion 21g of the card holder 21 is loosely fitted.

A claw 51e formed at the distal end of the lock lever 51 is disposed between the card holder 21 and the tapered protrusion 46. A bent protrusion 51f of the lock lever 51 comes in contact with a contact piece 54 of the card detecting switch 18 such that the lock lever 51 is biased in the clockwise direction by the spring force of the contact piece 54, while maintaining a contact of the claw portion 51e with the tapered protrusion 46, and a contact of a tapered portion 51g with a protrusion 58a of a card detecting plate 58. A non-conductive plastic piece 54a is attached at one end of the contact piece 54 so as to insulate the card detecting switch 18 from the lock lever 51.

The card detecting plate 58 is formed with a hook 58b and two protrusions 58c and 58d for detecting that the memory card 3 is connected to the connector 17. The hook 58b is pushed by the front end 3b of the memory card 3 immediately before the memory card 3 is coupled to the connector 17. The protrusions 58c and 58d are movably entered into guide holes 21i and 21j of the card holder 21. One end of the coil spring 29 is coupled to the protrusion 58a to bias the card detecting plate 58 toward the card inlet port 4. The coil spring 29 is extended between the slide plate 24 and the card detecting plate 54 to bias them in opposite directions, thereby omitting another coil spring.

A card pushing spring 61 is fixedly mounted on the card holder 21 by a screw 14a. A narrow arm 61a of the card pushing spring 61 extends into the card receiving chamber 13 via a side hold 21k of the card holder 21. The arm 61a pushes the side edge of the memory card 3 so as to ensure a reliable engagement of the recess 3c of the card 3 with the lock claw 51b. An elongated hole 61b of the card pushing plate 61 engages with a claw 21l of the card holder 21, and the opposite ends of the hole 61b are received by protrusions 21m and 21n of the card holder 21.

Figure 3:
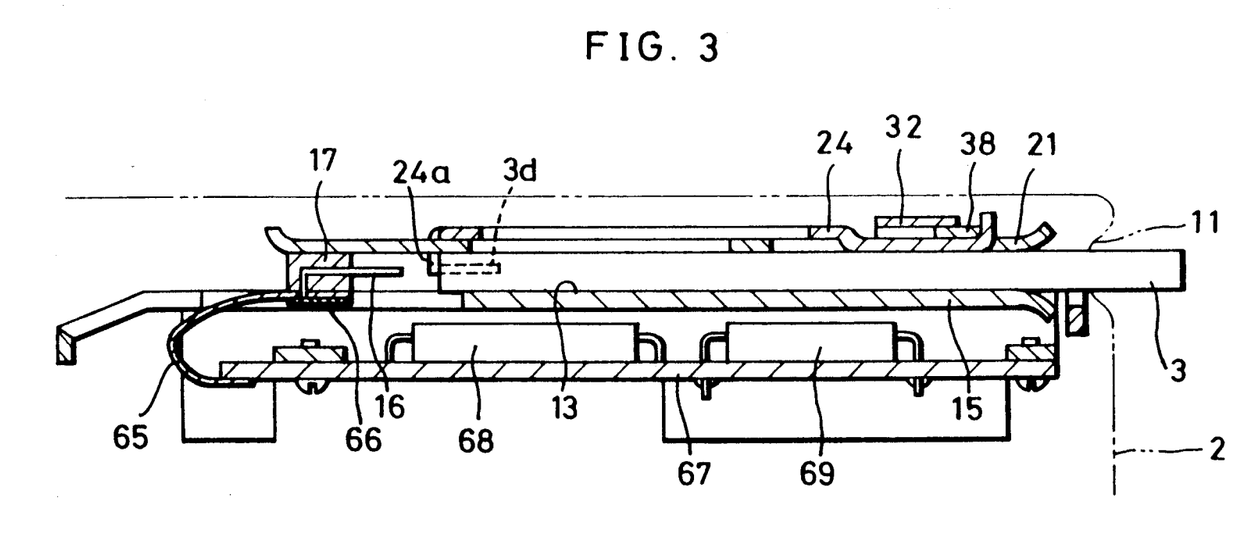
FIG. 3 is a cross section of the embodiment shown in FIG. 2, with a memory card being in a completely dismounted state; 15

As shown in FIG. 3, the plurality of terminal pins 16 planted on the connector 17 are bent into an L-character shape, the end of each pin being connected to one end of a flexible wiring sheet 65. To the connection area of the sheet 65, there is attached a plastic plate 66 for reinforcing the connection area. Lead wires from the card detecting switch 18 are also connected to the flexible wiring sheet 65. The flexible wiring sheet 65 is connected to a printed circuit board 67 fixedly mounted on the back of the chassis 15. On the printed circuit board 67, there are mounted IC circuits 68 and 69 constituting a read/write controller of the memory card 3, and other associated circuits. The printed circuit board is not mounted with the connector 17, nor is it used as a wall of the card receiving chamber. Therefore, the effective application of the printed circuit board can be improved, the size of the board can be made small, and a dip solder method can be used for assembling circuit components. The printed circuit board 67 may mount components on both sides thereof.

Figure 4:
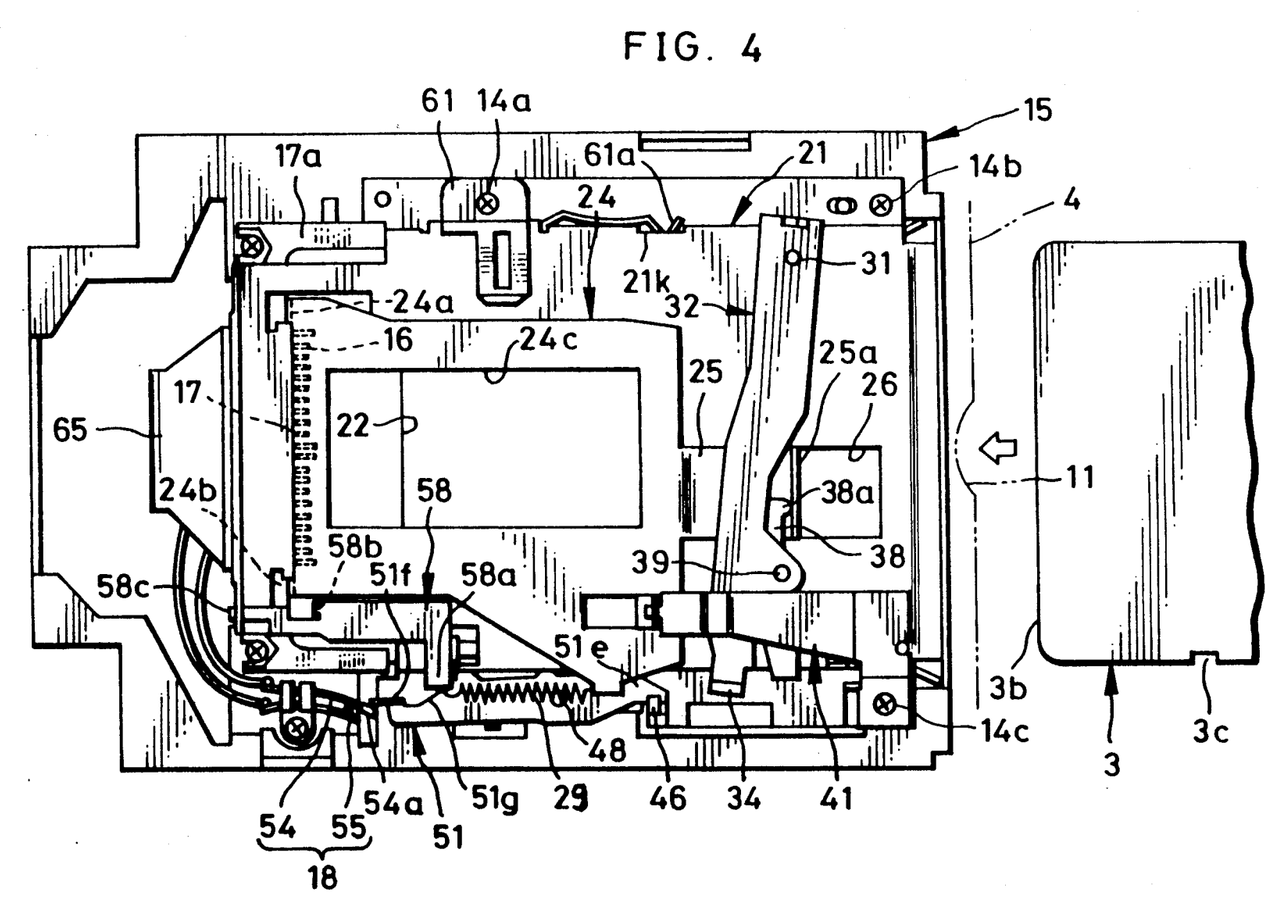
FIG. 4 is a front view of the embodiment shown in FIG. 2, before loading a memory card.

The operation of the embodiment will be described with reference to FIGS. 4 to 7. As shown in FIG. 4, prior to loading a memory card 3, the card detecting plate 58 is being biased by the coil spring 29 so that the hook 58b takes an initial position whereat it is in contact with the shoulder 28a of the guide opening 28 (see FIG. 2). At this initial position, the side edge 58a of the card detecting plate 58 pushes down the tapered portion 51g of the lock lever 51. Since the lock lever 51 pushes the plastic piece 54a of the protrusion 51f, the contact piece 54 comes in contact with the contact piece 55 to hold the card detecting switch 18 in an ON state. While the card detecting switch 18 takes the ON state, power is not supplied to necessary circuit portions of the electronic still camera 2 so that it cannot take a picture. The slide plate 24 is set at the retracted position by the coil spring 29, with the hooks 24a and 24b being entered into recesses 17c of the connector 17.

As a memory card 3 is inserted into the card receiving chamber 13 via the card inlet port 4, the front end 3b of the memory card 3 comes in contact with the hook 58b of the card detecting plate 58, providing a light impact to the user. As the memory card 3 is further pushed within the card receiving chamber 13, the card detecting plate 58 moves backward against the force of the coil spring 29. At this time, the terminal holes 3d of the memory card 3 are engaged with corresponding ones of the terminal pins 16. As the card detecting plate 58 moves backward, the lock lever 51 is rotated in the clockwise direction about the boss 48 by the elasticity of the contact piece 54. As a result, the card detecting switch 18 is turned OFF, and the claw 51b of the lock lever 51 enters the recess 3c of the memory card 3 to prevent the card 3 from being slipped out of the card receiving chamber 13.

Figure 5:
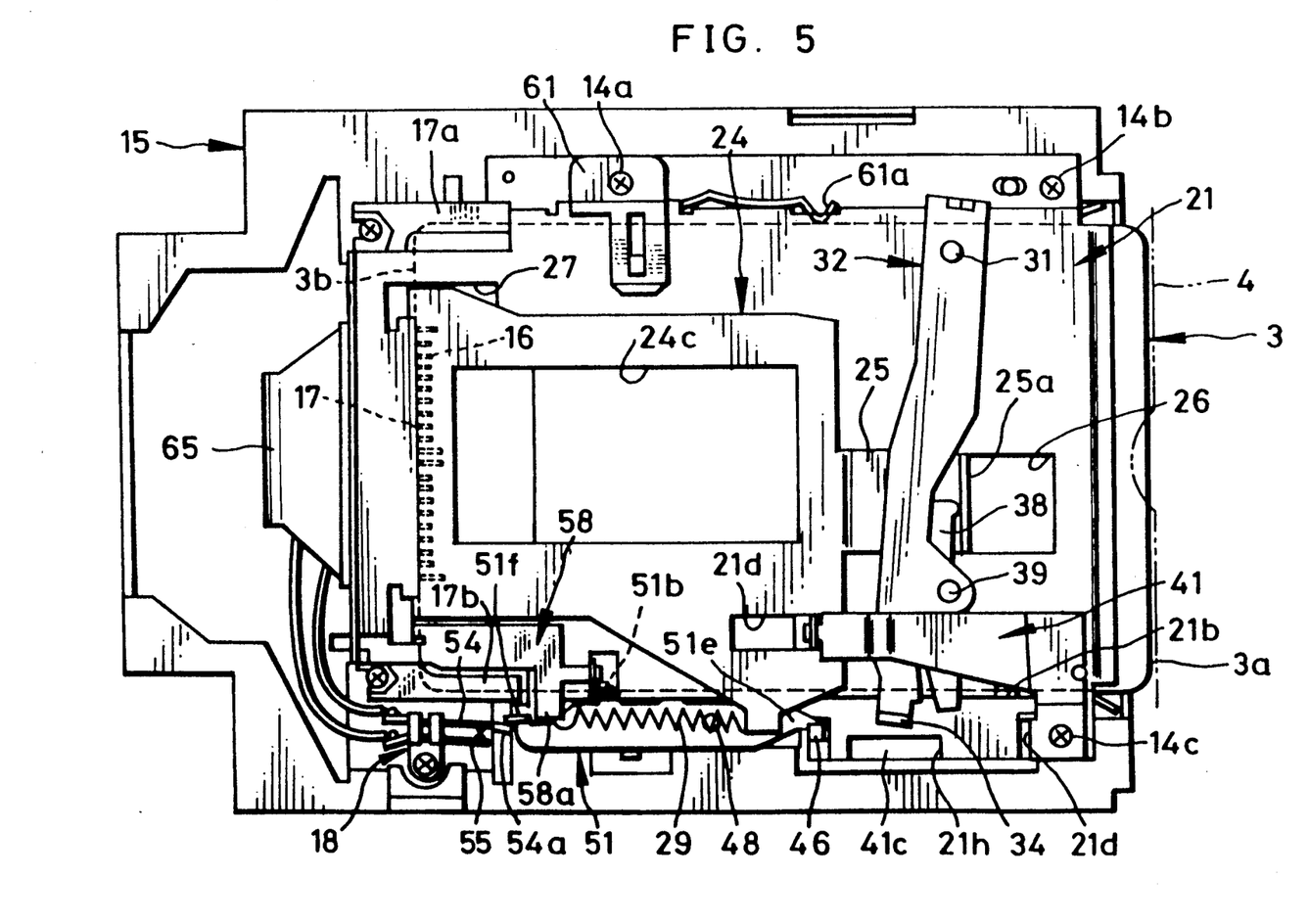
FIG. 5 is a view similar to FIG. 4, with a memory card being loaded.

As shown in FIG. 5, as the memory card 3 is completely housed within the card receiving chamber 13, the card detecting switch 18 is turned OFF as described above, so that circuit components of the electronic still camera are powered allowing the taking of a picture. With the card completely in the loaded state, the rear end 3a of the memory card 3 is inside the card inlet port 4 so that it can no longer be touched by the user's fingers. As is well known, upon operation of a release button while directing the electronic still camera 2 to a subject, the taken scene is converted into video signals which are sent via the read/write controller to the memory card 3, and written in the built-in RAM, as is well-known in the art.

After taking scenes for a predetermined number of frames, the memory card 3 is removed from the electronic still camera 2. To remove the memory card 3, first the lock release button 7 is depressed. The distal end of the lock release button 7 pushes the spring portion 41c of the plate spring 41 via the recess 21h of the card holder 21. Since the tapered protrusion 46 of the plate spring 41 covers over the claw 51e of the lock lever 51, as the tapered protrusion 46 is pushed in the direction perpendicular to the drawing sheet, the claw 51e is pushed upward to rotate the lock lever 51 in the counter-clockwise direction about the boss 48. As a result, the lock claw 51b goes out of the recess 3c of the memory card 3, and the protrusion 51f moves downward. The protrusion 51f pushes down the contact piece 54 to make the contact piece 54 come in contact with the contact piece 55. Thus, the card detecting switch 18 is turned ON so that the electronic still camera 2 is now unable to take a scene.

As the eject knob 6 is slid in the arrow direction while depressing the lock release button 7, the distal end 34 of the associated lever 32 is pushed to rotate the lever 32 in the counter-clockwise direction. The side edge of the step 32a of the associated lever 32 pushes the side edge of the eject lever 38, so that the eject lever 38 moves in association with the associated lever 32. The projection 38a of the eject lever 38 pushes the bent portion 25a of the tongue 25. As a result, the slide plate 24 moves from the retracted position shown in FIGS. 4 and 5, via the intermediate position shown in FIG. 6, and toward the eject position shown in FIG. 7.

Figure 6:
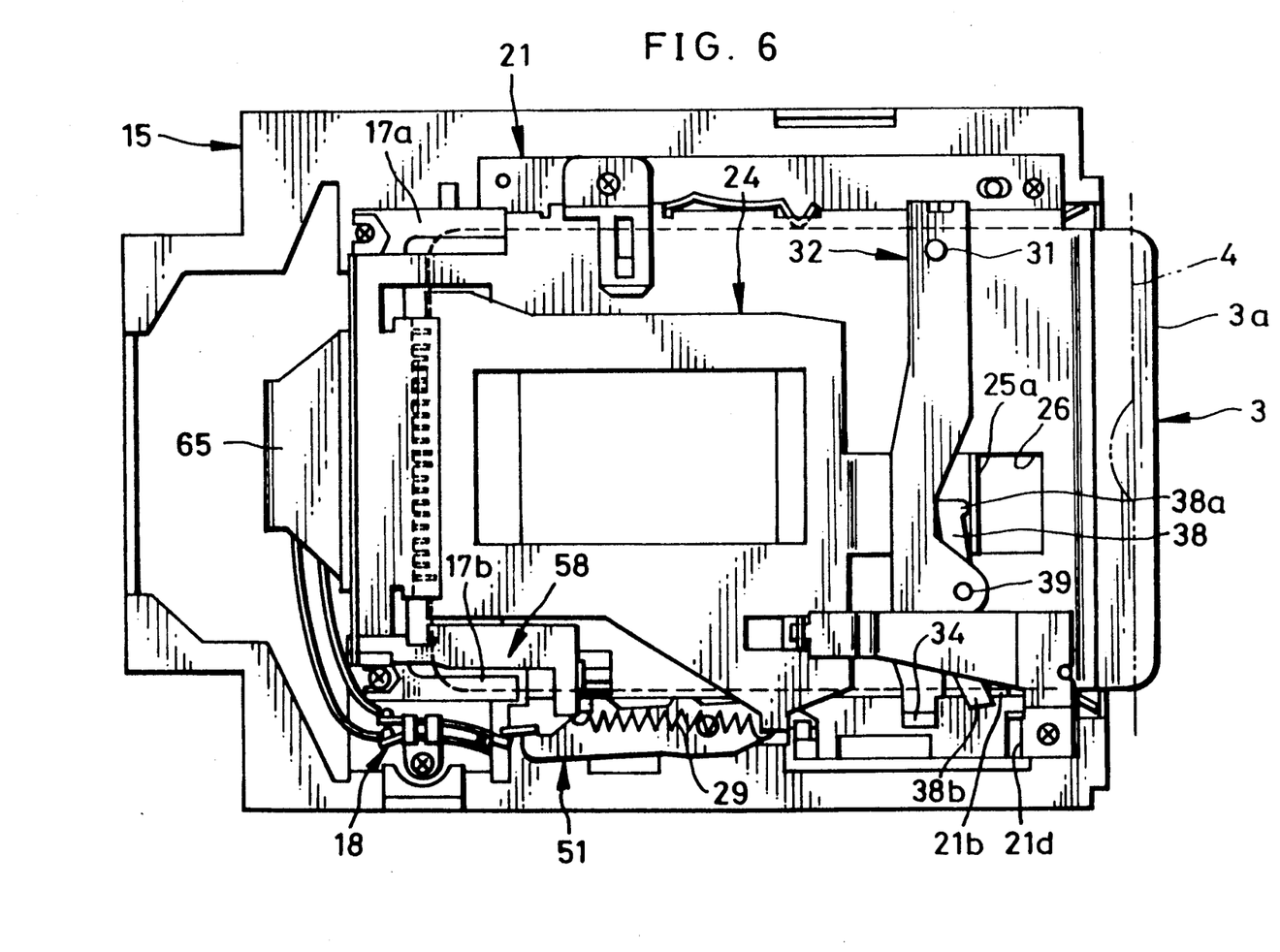
FIG. 6 is a view similar to FIG. 4, with a memory card being dismounted from a connector.

The slide plate 24 moves while hooking the front end 3b of the memory card 3 with the two hooks 24a and 24b at the rear end of the slide plate 24, thereby removing the terminal holes 3d of the memory card 3 out of the corresponding ones of the terminal pins 16. In this case, a large force is necessary to dismount the memory card 3 from the connector 17. However, a combination of the associated lever 32 and the eject lever 38 form a lever having the boss 31 as its fulcrum. Therefore, it is possible to slide the eject knob 6 with a small force. The card detecting plate 58 moves following the memory card 3, and returns to the initial position whereat the hook 58b comes in contact with the one end 28a of the hook 58b. When the card detecting plate 58 returns to the initial position, the lock lever 51 is held in the lock release position and the card detecting switch 18 is maintained in the ON state, even if the user's fingers are detached from the lock release button 7.

Immediately after the memory card 3 is dismounted from the connector 17, the end 38b of the eject lever 38 comes in contact with the stopper 21b as shown in FIG. 6. As the eject knob 6 is further slid, the eject lever 38 functions as the second stage lever by rotating in the clockwise direction about the stopper 21b as a fulcrum. The motion amount of the protrusion 38a of the eject lever 38 is greater than that of the boss 39 coupled to the associated lever 32. It is therefore possible to move the slide plate 24 greatly by a small slide of the eject knob 6 Although the second stage lever having a smaller leverage provides a high speed for ejection, the eject knob 6 slides with a small force because the memory card 3 has already been dismounted from the connector 17.

Figure 7:
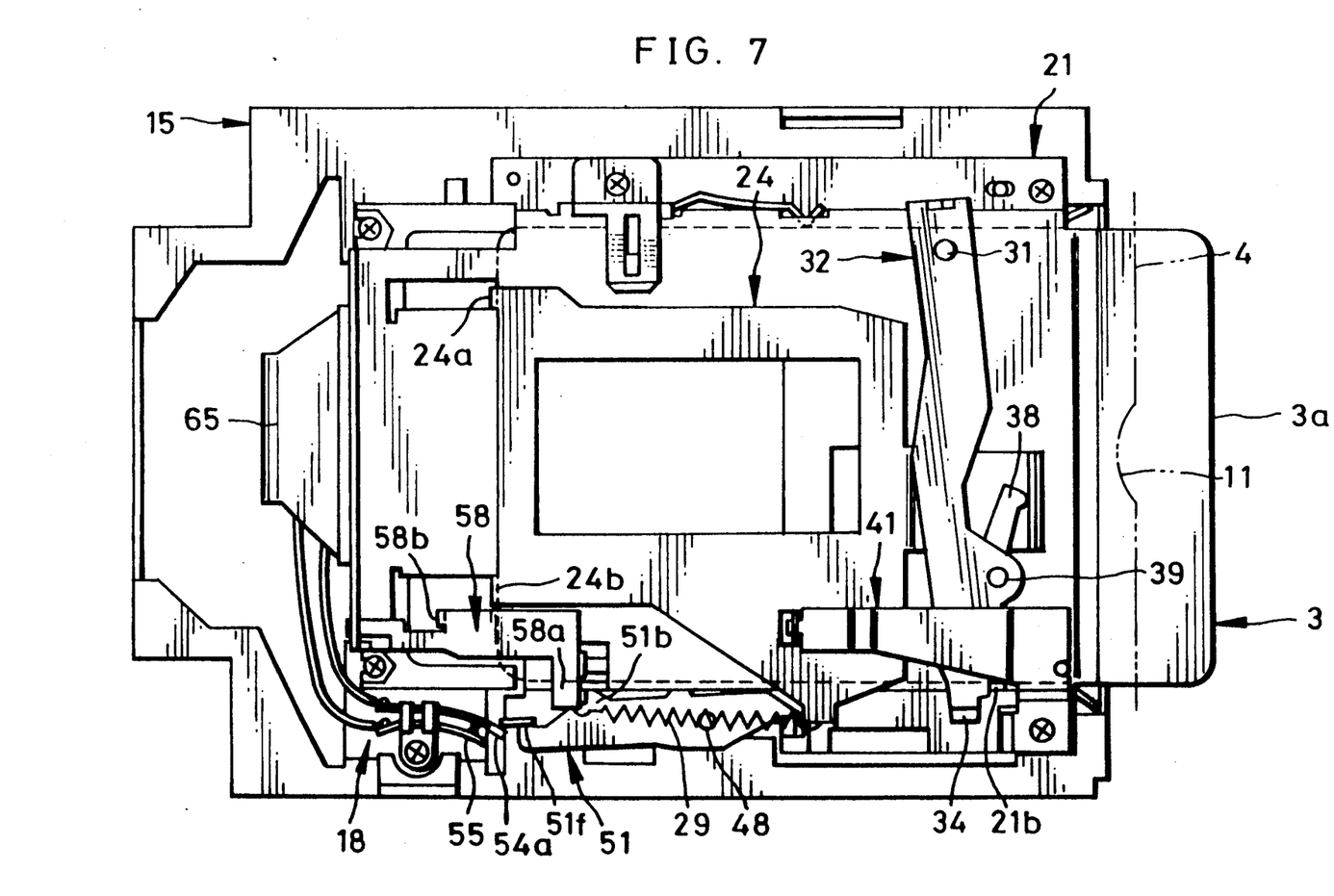
FIG. 7 is a view similar to FIG. 4, with a memory card being in a completely dismounted state.

As the eject lever 38 rotates, the slide plate 24 is pushed, the bent portion 25a of the slide plate 24 takes the eject position whereat it comes in contact with the end of the guide opening 26, as shown in FIG. 7, to complete the ejection operation of the memory card 3. In this eject completed state, the rear end 3a of the memory card 3 extends a great amount out of the card inlet port 4. It is therefore possible for a user to enter a finger in the recess 11 and pull out the memory card 3. As the user's finger detaches from the eject knob 6, the accumulated force of the coil spring 29 causes the slide plate 24 to recover to the retracted position as shown in FIG. 4. Following the operation of the slide plate 24, the eject lever 38 and associated lever 32 together with the eject knob 6 recover to the initial positions.

The memory card ejector of the present invention has been described while presenting the embodiment applied to an electronic still camera. The present invention is also applicable to other electronic apparatuses using a memory card. Although the present invention has been fully described by way of the preferred embodiment thereof with reference to the accompanying drawings, various changes and modifications will be apparent to those of working skill in this field. Therefore, unless these changes and modifications otherwise depart from the scope of the present invention, they should be construed as included therein.

What is claimed is:

1. An ejector for ejecting a memory card from a card receiving chamber, comprising:
   a slide member movable between a retracted position and an eject position, at said retracted position said memory card being connectable to a connector mounted at an innermost position of said card receiving chamber, and at said eject position a rear end of said memory card extending out of said card receiving chamber while a front end of said memory card is pushed by said slide member;
   an operation member operated when said memory card is ejected;
   an associated member swingable between a first range and a second range, in association with said operation member;
   an eject member for moving said slide member from said retracted position to said eject position, said eject member being rotatably mounted on said associated member and moving integrally with said associated member while said associated member swings in said first range, and during the motion of said eject member, one end of said eject member causing said slide member to move from said retracted position to dismount said memory card from said connector; and
   a stop member for receiving the other end of said eject member to rotate said eject member while said associated member rotates in said second range, said slide member being moved to said eject position by rotation of said eject member.

2. An ejector according to claim 1, wherein one end of said associated member is rotatably supported, and the other end thereof is coupled to said operation member.

3. An ejector according to claim 2, wherein said operation member is slidable.

4. An ejector according to claim 3, wherein said card receiving chamber is defined by a chassis and a card holder having a channel shape mounted on said chassis.

5. An ejector according to claim 4, wherein said slide member includes at least one hook for pushing said front end of said memory card, and said at least one hook extends via a guide opening formed in said card holder int said card receiving chamber, under the condition in which said slide member is superposed upon a card holder.

6. An ejector according to claim 5, wherein said slide member includes a tongue which is adapted to come in contact with said eject member, and said tongue is slidable and in engagement with a second guide opening formed in said card holder.

7. An ejector according to claim 6, wherein said associated member is swingably mounted on said card holder so as to superpose upon said tongue.

8. An ejector according to claim 7, further comprising: a card detecting member for detecting that said memory card is at a load completed position at which said memory card is completely connected to said connector, while said card detecting member is pushed by said front end of said memory card under loading; a card lock member for locking said memory card at said load completed position while said card lock member moves in association with said card detecting member from a lock release position to a lock position; a lock release member for releasing a locked state of said card lock member; and switch means for detecting that said card lock member is at said lock position.

9. An ejector according to claim 8, wherein said switch means includes a first contact piece which is pushed by said card lock member and a second contact piece which comes in contact with said first contact piece, said first contact piece having an elasticity for biasing said card lock member toward said lock position.

10. An ejector according to claim 9, wherein said first contact piece is coated with insulating material at an area where said first contact piece contacts said card lock member.

11. An ejector according to claim 10, further comprising a spring member extended between said slide member and said card detecting member, said spring member biasing said slide member toward said retracted position and biasing said card detecting member in the direction of ejecting said memory card.

12. An ejector according to claim 11, further comprising a printed circuit board mounted on a back surface of said chassis, and a flexible wiring sheet electrically connecting said printed circuit board to said connector.

13. An ejector according to claim 12, wherein said connector is mounted on said chassis.

14. An ejector for ejecting a memory card from a card receiving chamber, comprising:
    a card holder forming said card receiving chamber;
    a slide member superposed on said card holder, for moving between a retracted position and an eject position, at said retracted position said memory card being connectable to a connector mounted at an innermost position of said card receiving chamber, and at said eject position a rear end of said memory card extending out of said card receiving chamber;
    a hook formed on said slide member for pushing a front end of said memory card while said slide member moves toward said eject position;
    a guide opening formed in said card holder so as to guide a movement of said slide member, via said guide opening said hook being extended into said card receiving chamber;
    an operation member which is slid when ejecting said memory card; and
    an associated lever rotatably supported by said card holder for moving said slide member from said retracted position to said eject position, in association with said operation member.

15. An ejector for ejecting a memory card from a card receiving chamber, comprising:
    a slide member for moving between a retracted position and an eject position, at said retracted position said memory card being connectable to a connector mounted at an innermost position of said card receiving chamber, and at said eject position a rear end of said memory card extending out of said card receiving chamber while a front end of said memory card is pushed by said slide member;

an operation member which is slid when ejecting said memory card;

an associated member for moving said slide member from said retracted position to said eject position, one end of said operation member being coupled to said associated member and the other end thereof being rotatably supported;

a card detecting member for detecting that said memory card is connected to said connector; and a spring member for biasing said slide member toward said retracted position and biasing said card detecting member in the direction of ejecting said memory card, said spring member being extended between said slide member and said card detecting member.

16. An ejector for ejecting a memory card from a card receiving chamber, comprising:

a slide member for moving between a retracted position and an eject position, at said retracted position said memory card being connectable to a connector mounted at an innermost position of said card receiving chamber, and at said eject position a rear end of said memory card extending out of said card receiving chamber while a front end of said memory card is pushed by said slide member;

a card lock member for locking said memory card by moving to a lock position when said memory card is completely loaded within said card receiving chamber; and switch means for generating a memory card load completion signal by detecting that said card lock member is at said lock position.

17. An ejector for ejecting a memory card from a card receiving chamber, comprising:

a chassis;

a card holder having a generally channel shape and fixedly mounted on said chassis, said chassis and said card holder defining said card receiving chamber;

a connector disposed at an innermost position of said card receiving chamber, said connector being connected to said memory card when said memory card is loaded in said card receiving chamber;

a printed circuit board connected to said connector and mounted on a bottom surface of said chassis;

a slide member for moving between a retracted position and an eject position, at said retracted position said memory card being connectable to said connector, and at said eject position a rear end of said memory card extending out of said card receiving chamber while a front end of said memory card is pushed by said slide member;

an operation member which is slid when ejecting said memory card; and an associated member for moving said slide member from said retracted position to said eject position, one end of said associated member being coupled to said operation member and the other end thereof being rotatably supported.

* * * * *